(12) United States Patent
Redmann

(10) Patent No.: US 8,111,043 B2
(45) Date of Patent: Feb. 7, 2012

(54) METHOD AND APPARATUS FOR CHARGING AN ELECTRIC VEHICLE FROM A STREETLIGHT

(76) Inventor: William Gibbens Redmann, Glendale, CA (US)

(*) Notice: Subject to any disclaimer, the term of this patent is extended or adjusted under 35 U.S.C. 154(b) by 456 days.

(21) Appl. No.: 12/387,877

(22) Filed: May 8, 2009

(65) Prior Publication Data

US 2010/0283426 A1 Nov. 11, 2010

(51) Int. Cl.
*H01M 6/50* (2006.01)
(52) U.S. Cl. ........................................ 320/109; 320/111
(58) Field of Classification Search ................... 320/109, 320/111
See application file for complete search history.

(56) References Cited

U.S. PATENT DOCUMENTS

| 2009/0177580 A1* | 7/2009 | Lowenthal et al. | 705/39 |
| 2010/0013434 A1* | 1/2010 | Taylor-Haw et al. | 320/109 |

* cited by examiner

*Primary Examiner* — Melissa Koval
*Assistant Examiner* — Temilade S Rhodes-Vivour

(57) ABSTRACT

Streetlights along streets and in parking lots are often suitably located for a vehicle to park in immediate proximity. An electric vehicle charging system and method allows the power supply previously dedicated to the streetlight to be used for electric vehicle recharging whenever the streetlight is not lit. In some embodiments, if the total of the current drawn by the electric vehicle charging and the lit streetlight is less than the rating of the streetlight power supply, then charging may continue even while the streetlight is lit. Further, if an electric vehicle so charging offers a utility-interactive inverter, then upon demand the electric vehicle may be available to supply power back to the electric grid.

20 Claims, 8 Drawing Sheets

METHOD AND APPARATUS FOR CHARGING AN ELECTRIC VEHICLE FROM A STREETLIGHT

FIELD OF THE INVENTION

The present invention relates generally to a system and method for charging electric vehicles by using the electric service provided for streetlights. More specifically, the present invention relates to a system and method for allowing the charging of electric vehicles when it does not otherwise threaten the operation of a streetlight whose power source has been tapped.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of infrastructure.

Provision of a vehicle charging infrastructure is inhibited primarily by cost: Such infrastructure has been expensive, typically requiring allocation of a physical location that vehicles can access and providing new electric service to that location.

OBJECTS AND SUMMARY OF THE INVENTION

The present invention relates generally to a system and method for charging electric vehicles by using the electric service provided to streetlights. More specifically, the present invention relates to a system and method for allowing the charging of electric vehicles when it does not otherwise threaten the operation of a streetlight whose power source has been tapped.

Presently, facility owners wishing to provide electrical vehicle charging stations need to identify a location to be reserved for vehicle recharging, provide electric service to that location (typically by providing additional, independent electric service from their electrical panel and through a new underground power conduit running to the location), connecting a vehicle charging station to that electric service, and protecting the vehicle charging station from being overrun by a vehicle. There is a need for a charging infrastructure for electric vehicles that substantially reduces the amount of new construction and new electrical service required to provide electrical service for charging at locations that vehicles can access.

There is a further need to provide such charging infrastructure in a manner that can minimize labor and materials costs, is arbitrarily scalable.

Additionally, there is a need to provide such charging infrastructure in easily accessed locations, but in a manner that is also aesthetic.

Further, there is a need for such charging infrastructure to fail safe, that is, to have no adverse affect on the operation of the streetlight.

The present invention satisfies these and other needs and provides further related advantages.

Herein, the term "streetlight" includes electrolier streetlights (on steel or concrete poles), utilitarian lights (on wooden power poles), whether found along streets, alleys, or in parking lots.

Herein, the term "circuit breaker" refers to a reusable circuit protection device.

The term "fuse" is usually a single-use circuit protection, however, where used herein, it may be acceptably substituted with a circuit breaker.

The terms "relay", "coil", and "contact" usually describe an electromechanical device (the "relay") which provides an electromagnetic "coil" in a first circuit to magnetically operate a switching "contact" in series with a second circuit when the "coil" is energized by a voltage or current; however, where used herein, "relay" may be acceptably substituted with a "solid-state relay" or other semiconductor circuit, for example employing such components as a triac, or opto-isolators. When such substitution is made, the term "contact" refers to that portion of the substitute (e.g., the two anodes of a triac) in series with the second circuit; and the term "coil" refers to that portion of the substitute which can be operated by a voltage or current to control the second circuit (e.g., the LED of an opto-isolator, or the gate of a triac). Such a substitute need not be a direct replacement for a relay, and may include analog and/or digital logic elements, including a microprocessor.

It is an object of the present invention to provide a charging infrastructure for electric vehicles that substantially reduces the amount of new construction and new electrical service required to provide electrical service for charging at locations that vehicles can access by using the electrical service already provided for use by streetlights.

It is an object of the present invention to provide such charging infrastructure in a manner that can minimize labor and materials costs by providing a charging station that may be mounted in or on a streetlight.

It is a further object of the present invention to provide such charging infrastructure in easily accessed locations, that is in or on streetlights along streets or in parking lots.

It is an object of the present invention to provide such charging infrastructure in a manner that is unobtrusive and aesthetic, yet easy to find for those looking for a charging station.

It is a still further object of the present invention for such charging infrastructure to fail safe such that operation of the streetlight is not affected.

Another object of the present invention is to allow electric vehicles with a utility-interactive inverter to be made available to the electric grid in cases of extreme demand.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 1 is a street scene showing electric vehicles connected to charging stations of the present invention.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
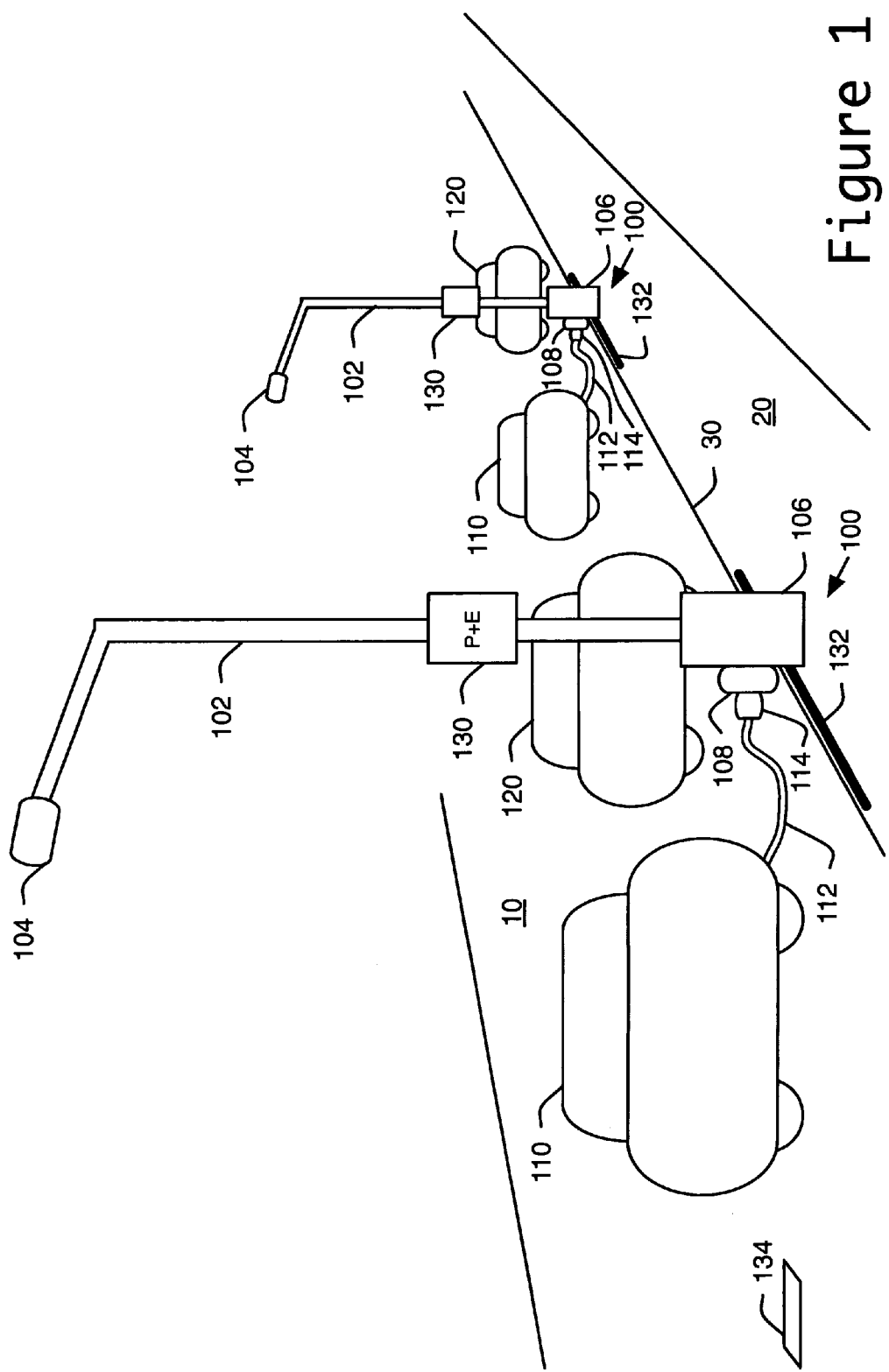

Referring to FIG. 1, sidewalk 20 parallels street 10, and is separated by curb 30. Charging stations 100 of the present invention comprise streetlights 102 having light fixture 104 for illuminating street 10. Cars 110 and 120 are parked along street 10, next to curb 30, where cars 110 are electric vehicles, or hybrid vehicles, and are connected by charging cord 112 terminated by plug 114 to outlet 108 in base 106 of charging station 100.

Signage 130, curb markings 132, and in-street markers 134 can designate streetlights 102 as being charging stations 100, since outlet 108 might not be easily seen by a driver looking for a parking or charging location. Designations 130, 132, and 134 may be used individually, or in combination.

Non-electric vehicles 120 are preferably prohibited from parking in the locations designated by signage 130 or curb markings 132 while connectors 108 may be used for charging; however, if outlet 108 is not available for charging, for example when a lamp in light fixture 104 is lit causing streetlight 102 to use much of its electricity supply, then such a prohibition from parking may not apply.

In an alternative embodiment, outlet 108 may be replaced by another form of coupler to which electric vehicles may standardize. For instance, rather than charging cable 112 with plug 114 inserted into outlet 108, another cable (not shown) may be attached in place of outlet 108 and have its own connector (not shown) that is inserted into electric vehicle 110 for charging. Herein, the term "outlet" should be considered include to such alternative embodiments.

Figure 2:
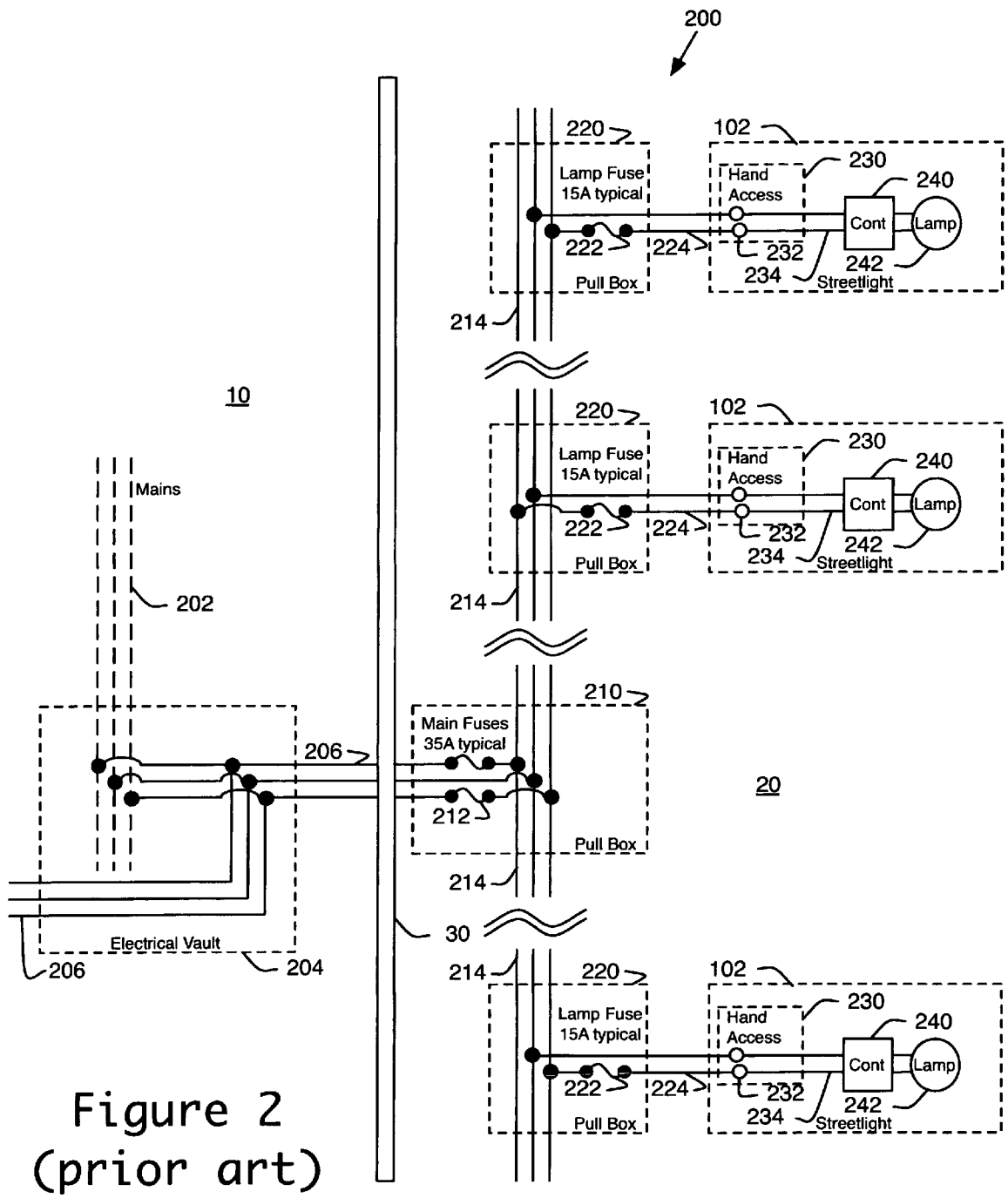
FIG. 2 is a wiring diagram for a block of typical municipal streetlights of the prior art.

In FIG. 2, a schematic of one prior art power supply 200 is shown to illustrate how power is supplied to streetlights 102. In this example, most of power supply 200 is located beneath street 10 and sidewalk 20. In other implementations, power for streetlights 102 may come from overhead wiring on power poles (described in conjunction with FIG. 4 below).

The power mains 202 are energized by a municipal supply (not shown) and may run for many miles. Periodically, for example every block, an electrical vault 204 is located below street 10. Access is typically a manhole cover (not shown). Within vault 204, power lines 206 are connect to mains 202 and run to one or both sides of the street 10 (only one side shown in FIG. 2), as needed to supply streetlights 102. Power lines 206 comprise multiple conductors that carry, typically, two or three phase alternating current. Lines 206 pass through a conduit, under curb 30, and into pull box 210 where main fuses 212 are located to limit the current draw of this interval of streetlights 102.

From main fuse pull box 210, power is distributed under sidewalk 20 by power lines 214 to each streetlight pull box 220, typically located in immediate proximity to corresponding streetlight 102. In each streetlight pull box 220, streetlight fuse 222 is provided to limit the current provided to streetlight 102 by power supply 200. The last leg is delivered by power lines 224, which pass under sidewalk 20, through conduit, into the base 106 (shown in FIG. 1) of streetlight 102.

Within streetlight 102 (under the prior art), power supply 200, delivered on power lines 224 was connected to internal wires 234 at connection 232, accessed through hand access port 230. Connection 232 is normally made after streetlight 102 has been erected. Internal wires 234 deliver power to control 240 to drive lamp 242 in light fixture 104 (shown in FIG. 1). Control 240 may comprise a starter and/or ballast or other circuit as needed to start and run lamp 242. Control 240 may further comprise a photoelectric sensor or a timer (neither shown) to turn on streetlight 102 as it gets dark and turn off as it gets light. Most municipalities require control 240 to fail-safe, so if something goes wrong with the sensor or timer of control 240, corresponding streetlight 102 is on all of the time, rather than being off all of the time.

The importance of FIG. 2 is not only to describe an example of power supply 200 and its protective elements, fuses 212 and 222, but also to illustrate how much infrastructure, often below ground, is already in place to provide street lighting. Those skilled in the art already appreciate the difficulty of increasing the amount of power that supply 200 can deliver: All of cables 202, 206, 214, and 224 may need to be replaced with larger gauges. The underground conduits carrying the present cables may be inadequate for larger conductors. Likewise, fuses 212 and 222 would need replacement.

Figure 3:
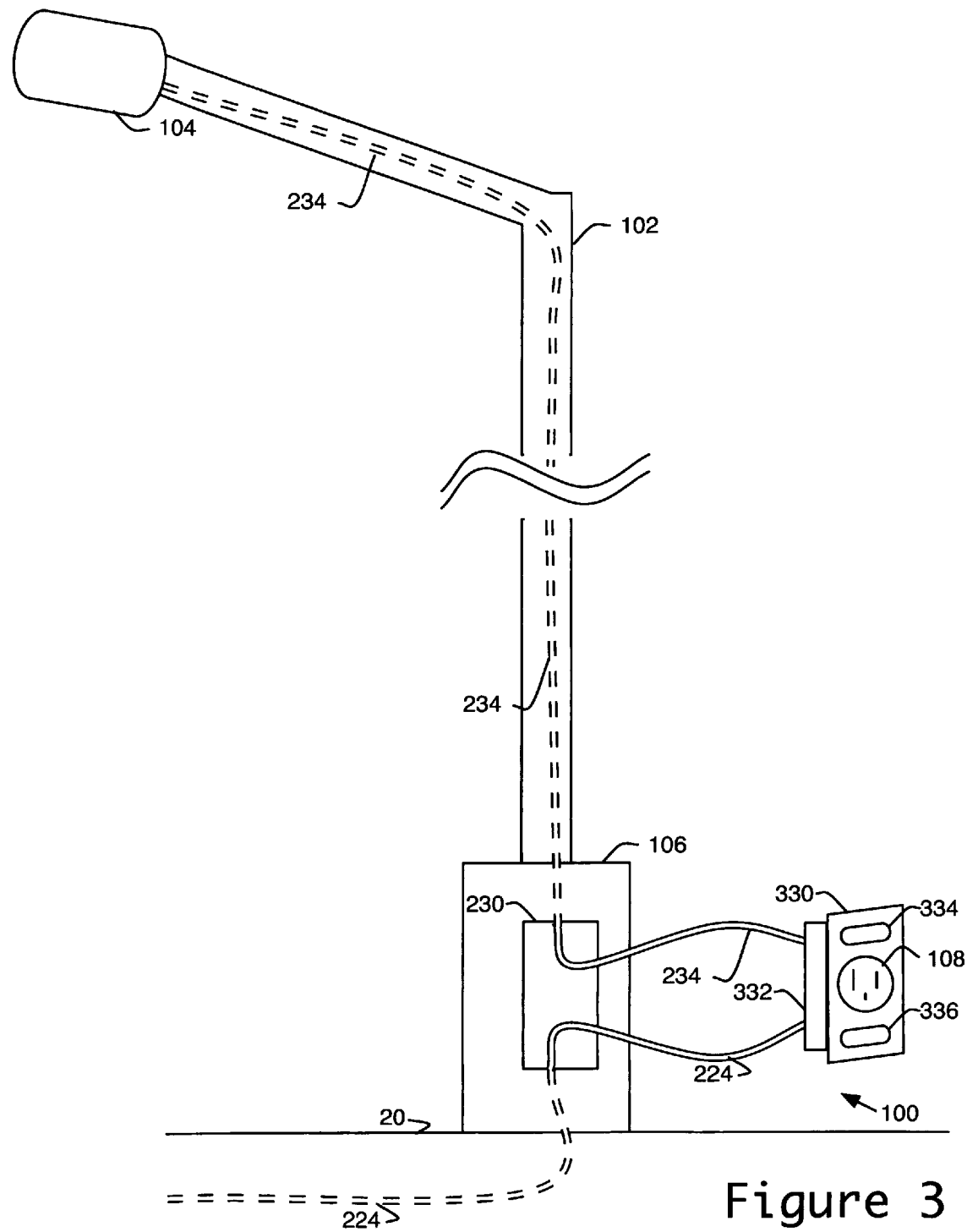
FIG. 3 shows a charging station using an electrolier streetlight.

Referring to FIG. 3, The conversion of streetlight 102 into charging station 100 of the present invention is shown. Power lines 224 enter base 106 of streetlight 102 from beneath sidewalk 20. Preferably, charging station panel 330 is a modification of or substitution for the cover panel for hand access port 230. Rather than internal wiring 234 connecting directly to power lines 224 at connection 232, both connect separately to charging control module 332. Internal wiring 234 still runs up to light fixture 104, containing control 240 and lamp 242 (shown in FIG. 2).

Charging control module 332 is preferably located inside of streetlight 102 when hand access port 230 is covered by charging station panel 330, exposing only outlet 108, reset switch 334, and input 336. Outlet 108, as described above, connects with plug 114 of charging cable 112 of electric vehicle 110 for charging. Reset switch 334 and input 336, when provided, are described below, in conjunction with FIGS. 5-8.

In some embodiments of charging cable 112 and plug 114, an integral ground-fault circuit interrupt may be provided (not shown), in which case ground-fault circuit interrupt functions need not be supplied by charging station 100.

Figure 4:
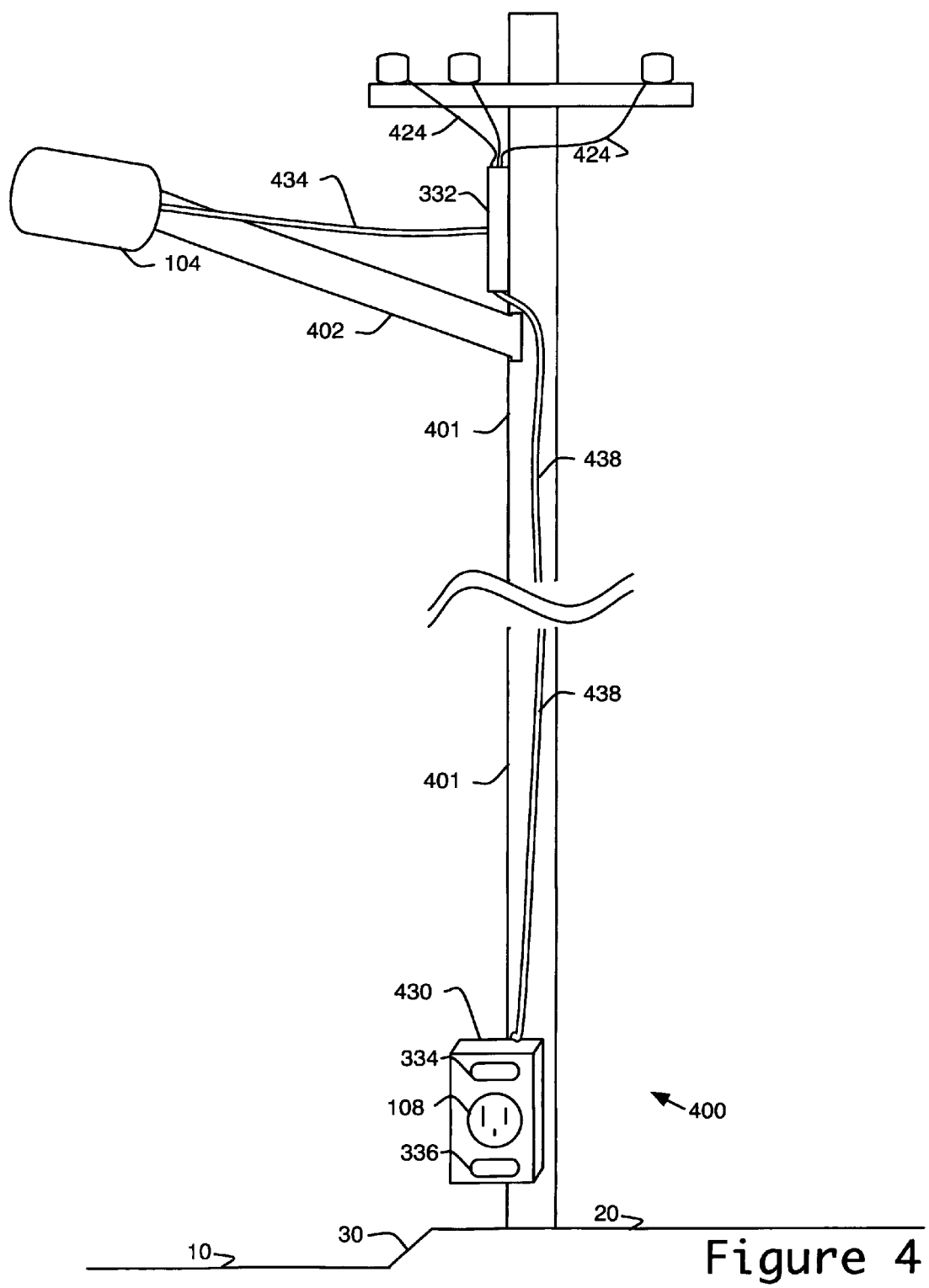
FIG. 4 shows a charging station using a utilitarian streetlight.

An alternative embodiment of the present invention, shown in FIG. 4, is charging station 400, comprising utilitarian streetlight 402 mounted to power pole 401. Streetlight 402 has light fixture 104 which in the prior art would typically be connected directly to power supply lines 424, but in the present invention is connected to charging control module 332 by lamp wiring 434. Power supply lines 424 should provide one or more phases of alternating current suitable for powering light fixture 104, and should be protected by a fuse (not shown in FIG. 4). Power supply lines 424 feeds charging control module 332. Extension cable 438 allows outlet 108, reset switch 334 and input 336 to be located in box 430 at a convenient, accessible height.

Figure 5:
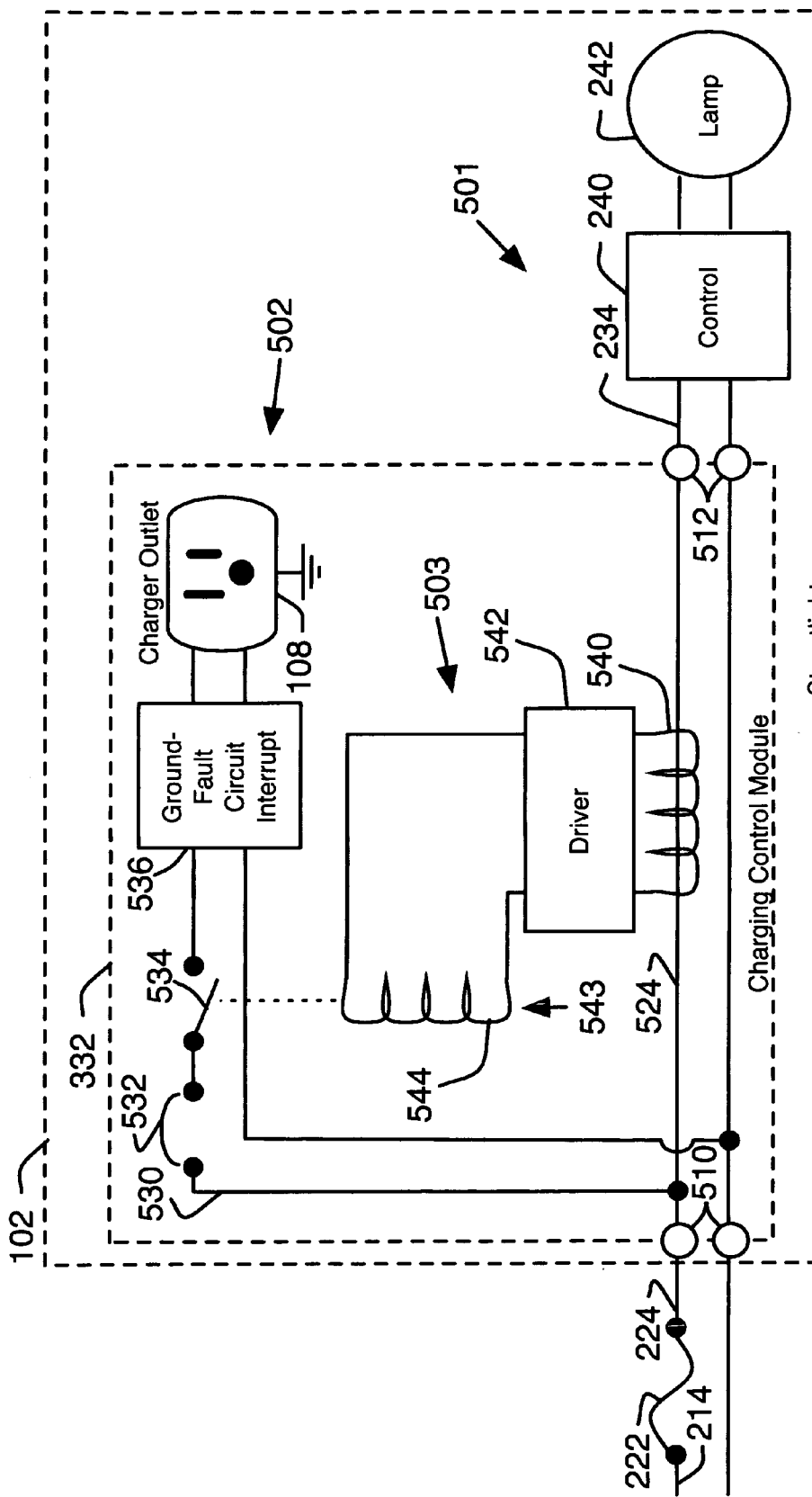
FIG. 5 is an example schematic for a charging station monitoring a streetlight.

The details of one implementation of charging control module 332 are shown in FIG. 5. Power supply lines 214 are protected by fuse 222 and delivered to input terminals 510 by power lines 224.

Lighting circuit 501 is completed by passing the power supply through charging control module 332 to output terminals 512, to streetlight internal wiring 234 to control 240, which in turn provides power to lamp 242 when lit. The power to control 240 and lamp 242 and their operation is unaffected by the insertion of charging control module 332, which has merely elongated connection 232 by the insertion of terminals 510 and 512 and conductors 524.

Charging circuit 502 comprises conductors 530 which tap into conductors 524 at or near input terminals 510. Charging circuit 502 further comprises, in series, a circuit breaker 532 to limit the current drawn through outlet 108 (i.e., by the vehicle 110 charging); a relay contact 534 (discussed below in conjunction with detector circuit 503); a ground-fault circuit interrupt 536 (if required); and, outlet 108. While circuit breaker 532, contact 534, and ground-fault interrupt circuit 536 are closed, outlet 108 is available to charge vehicle 110.

Where charging cable 112 or plug 114 contains integral ground-fault protection, ground-fault circuit interrupt 536 may be omitted.

Charger outlet 108 may contain an interlock (not shown) whereby no electric potential is delivered to the contacts of outlet 108 until plug 114 is seated.

In the case where circuit breaker 532 or ground-fault circuit interrupt 536 are tripped, they can be reset with switch 334 (not shown in FIG. 5).

Preferably, ground-fault circuit interrupt 536 is provided with a test button (not shown) that simulates a current leak to ground, e.g., through a resistor (not shown). Alternatively, such a test may be performed by an external tester (not shown) plugged into outlet 108, which shunts a small amount of current to ground.

In particular, circuit breaker 532 must be of a lower current rating and/or faster break response time than fuse 222 so that a inadvertent draw of excess current through charging circuit 502 trips breaker 532 (which can be reset by the operator of vehicle 110) rather than blowing fuse 222, which requires a maintenance service call.

Control circuit 503 comprises detector 540 for detecting current flow in lighting circuit 501 and a driver 542 for operating relay 543 when the current in circuit 501 indicates that lamp 242 is lighting or lit.

The response time of control circuit 503 must be sufficiently fast that the steady state maximum draw on charging circuit 502 plus any in-rush current as control 240 begins to light lamp 242 does not damage fuse 222 before contact 534 opens circuit 502. Response time under 100 mS should be adequate in most cases, with response time of one-half cycle of the alternating current being preferred.

As previously defined, relay 543 comprising coil 544 and contact 534 may be an electromechanical device, or an analogous solid-state device (an example of which is Model A2425 manufactured by Crydom, Inc. of San Diego, Calif.). Contact 534 of relay 543 may be normally-open, with coil 543 energized when the current sensed by detector 540 indicates lamp 242 is not lit. Alternatively, contact 534 may be normally-closed, with coil 543 energized when detector 540 indicates lamp 242 is lit or lighting. Still another alternative would be for breaker 534 to have a shunt-trip input such that the contacts of breaker 532 would also serve as contact 534 and let coil 544 be the shunt-trip mechanism internal to the breaker (an example of such a device is the ED21B015 circuit breaker with the S01ED60 shunt trip accessory manufactured by Siemens Energy & Automation Inc. of Alpharetta, Ga.).

In still another embodiment, relay 543 may be a latching device which can be opened or closed by a corresponding pulse from driver 542. Following the pulse, relay 543 would remain in the same state (opened or closed) until commanded to switch.

Detector 540 may be an inductive coil (as shown), a hall effect device, or may require a sense resistor or current shunt inline with conductor 524 across which a voltage drop is developed to which driver 542 responds.

Driver 542 requires a power source (not shown), which may be tapped from input terminals 510, or developed inductively by detector 540 when current is flowing in conductors 524. In an alternative embodiment, a battery and/or a solar-powered photovoltaic (neither shown) may be used.

An example of a suitable, integrated detector 540, driver 542, and relay 543 is the AS3-NCAC-FF-15 Current Operated Switch by NK Technologies of Campbell, Calif., which integrates an inductive pickup for both current detection and power collection, drive electronics, and solid state relay. A similar product is the ECSJ407SC by Eaton Corporation, Moon Township, Pa.

In still another embodiment, control 240 may directly signal driver 542 (interconnection not shown) when lamp 242 is lit or lighting.

In yet another embodiment, detector 540 may be a photodetector that optically senses the strike and illumination from lamp 242.

Figure 6:
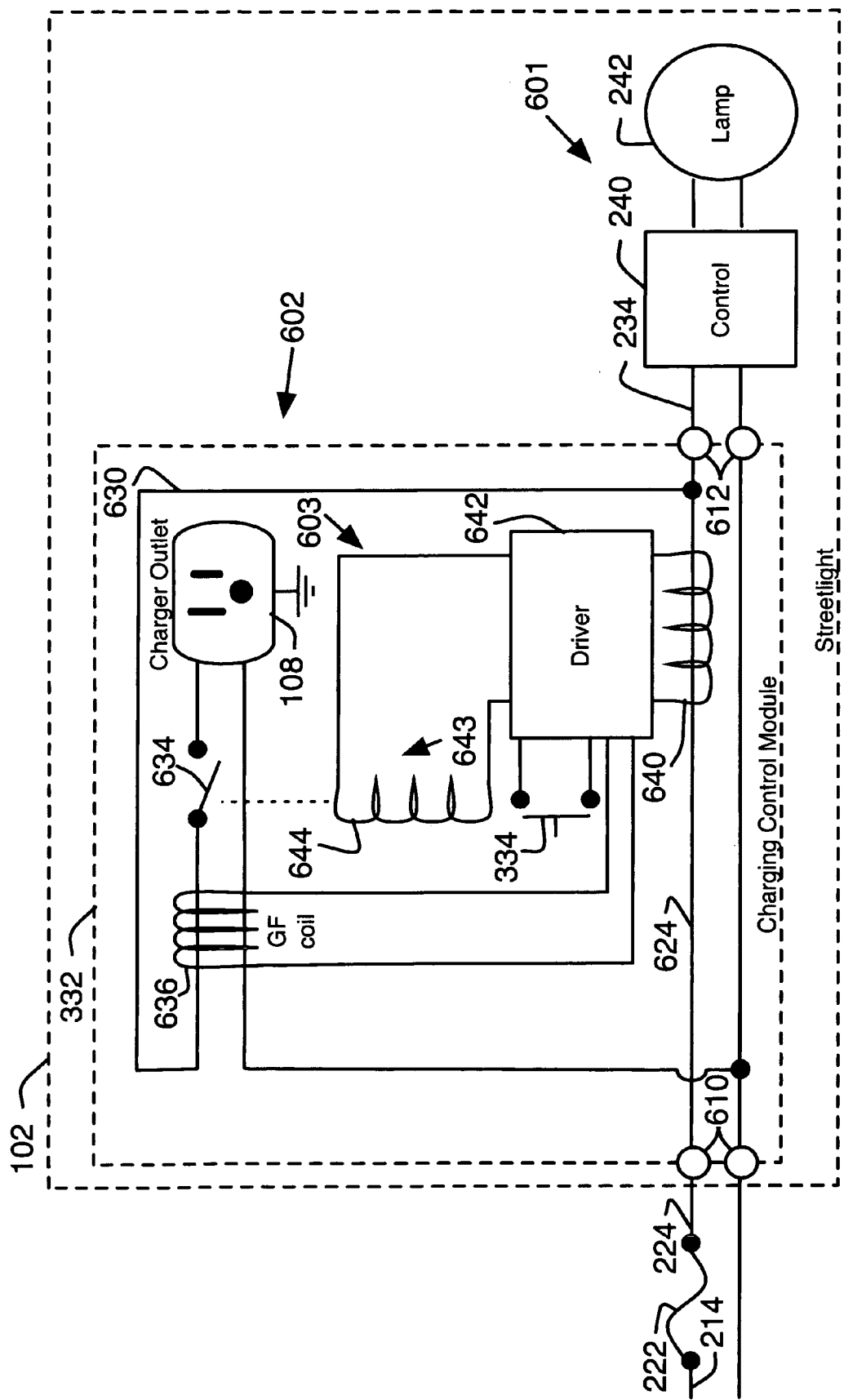
FIG. 6 is an example schematic of a charging station monitoring combined streetlight and charging current.

Another embodiment of charging control module 332 is shown in FIG. 6. This embodiment also consists of lighting circuit 601, charging circuit 602, and control circuit 603. Here, the primary difference is that control circuit 603 responds to the sum of the currents drawn by lighting circuit 601 and charging circuit 602, whereas control circuit 503 responds to just the status of lighting circuit 501 as determined by detector 540.

Here, the power supply is provided at input terminals 610 and passed by conductors 624 to output terminals 612 to the streetlight control 240 and lamp 242, forming lighting circuit 601. Charging circuit 602 is powered by conductors 624, but the pickoff conductor 630 is at or near output terminals 612 so that current detector 640 will read the sum of currents drawn by lighting circuit 601 and charging circuit 602.

The driver 642 shown in FIG. 6 is an example of a more integrated control circuit 603, where the ground-fault detection coil 636, current detector 640, and coil 644 of relay 643 implement the functions of control circuit 503, but without separate ground fault circuit interrupt 536 and circuit breaker 532.

In this arrangement, reset switch 334 may be electrical, as shown, and cause driver 642 to close contact 634, provided the current in conductor 624 is not already too high (i.e., using enough current that allowing a vehicle to charge would likely exceed the rating of fuse 222). Alternatively, reset switch 334 may be mechanical (not shown), allowing manual, latching closure of contact 634, again provided the current in conductor 624 is not already too high. Care should be taken that a mechanical reset switch 634 does not permit an operator to directly and continuously hold contact 634 closed, as this would override the control of driver 642 and could permit currents in conductor 624 to threaten fuse 222.

Having driver 642 responsive to the total of the currents drawn by lighting and charging circuits 601 and 602 is desirable, since a retrofit of streetlight 102 in which lamp 242 is replaced with an LED-based illuminator (not shown) would likely reduce the current draw of circuit 601 well below the rating of fuse 222, and this may be sufficient to allow simultaneous operation of lighting and charging circuits 601 and 602.

Figure 7:
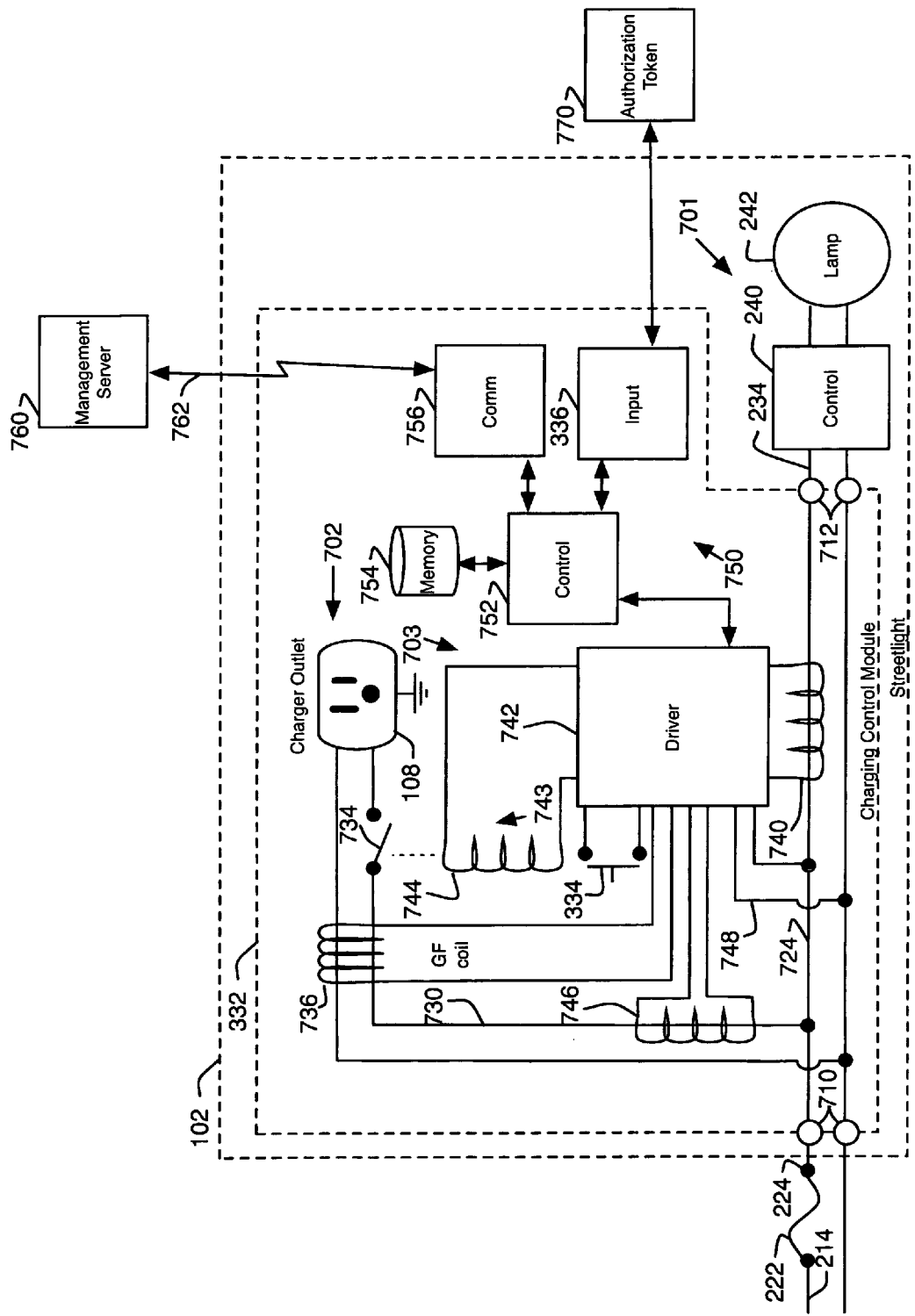
FIG. 7 is an example schematic of a charging station separately monitoring a streetlight and a charging current.

That same advantage can be obtained using another embodiment, shown in FIG. 7 in which the streetlight circuit 701 passes through charging control module 332 at input terminals 710, through conductors 724, and output terminals 712. Conductor 730 of charging circuit 702 taps off of conductors 724 near input terminals 710. Charging circuit 702 can be interrupted by contact 734 of relay 743. In this embodiment, charging control circuit 703 uses current sensor 740 to monitor the current in lighting circuit 701, while current sensor 746 is used to monitor the current in charging circuit 702. Driver 742 computes the total current drawn by lighting and charging circuits 701 and 702 (whether through an analog sum or through separate analog to digital conversions which are then summed). If the total current drawn is above a value determined to threaten fuse 222, then coil 744 is appropriately driven to cause contact 734 to open.

Ground-fault sensor 736 may be monitored by driver 742 to interrupt circuit 702 with relay 743 when a ground-fault is detected.

Switch 334 may be an electrical or mechanical switch to reset contact 734 following an over-current or a ground-fault detection which resulted in contact 734 being opened.

To measure power usage, driver 742 also comprises voltage monitor connection 748. The instantaneous product of the measured voltage (e.g., in volts) at connection 748 and the current measured with current detector 746 (e.g., in amps) represents the instantaneous power drawn through circuit 702 (in watts). By measuring this instantaneous power periodically (e.g., 1000 times per second) and multiplying that reading by the period (i.e., 1 mS), and accumulating the result as the measure of energy transferred (i.e., watt-seconds, or with the appropriate conversion factors, kilowatt-hours). A similar measure of energy delivered to lighting circuit 701 may also be made and recorded, if desired.

In a case where electric vehicle 110 comprises a utility-interactive inverter and power is being fed from electric vehicle 110 to power supply 214, then such instantaneous power measurements would register a supply of power by vehicle 110, rather than a draw, and may be credited in accordance with the utility's policy.

A similar measurement could be made with current detector 640 of charging control circuit 603 (which would, of course, require the additional of a voltage measurement connection like 748, not shown in FIG. 6), so that a power measurement would represent the total power being delivered to both lighting circuit 601 and charging circuit 602. Power measurements accumulated only when contact 634 was closed, or only during certain hours of the day, could be presumed to be substantially or exclusively due to energy delivered through charging circuit 602, if such a separation was desired.

FIG. 7 also shows monitoring and communication subsystem 750, which also may be connected to charge control circuit 503, 603.

Monitoring and communication subsystem 750 preferably comprises a control 752 having access to memory 754 for storing the software program of control 752. Memory 754 may also store data, for example, data representative of the accumulated power (i.e., energy, as in watt-hours) delivered through charger circuit 702 as measured and communicated by driver 742 to control 752. Such record of energy delivered is preferably stored in non-volatile memory. (Note that while this is a preferred implementation for an energy meter, other implementations are well known.)

Memory 754 may also contain a unique identifier for identifying charging control module 332, and by association, streetlight 102, which is useful for reporting and management. Alternatively, a unique identifier may be provided in control 752 (e.g., a unique CPU serial number) or in communications module 756 (e.g., a Media Access Control address, or MAC address).

Monitoring and communication subsystem 750 may comprise a human readable display (not shown) and/or a short range wireless reporting system (not shown) such as those commonly used for utility meter reading to allow efficient readout of the record of energy delivered and the unique identifier of the charge control module 332.

Preferably, monitoring and communication subsystem 750 further comprises communication module 756 which is able to connect through communication channel 762 with management server 760 located at a remote site, for status monitoring, meter reading, and billing (discussed below in conjunction with input 336). Communication channel 762 preferably comprises a wireless leg and may further comprise other communications legs, including the Internet. The wireless leg(s) may be based on any of a number of wireless network technologies, for example, cellular telephone, IEEE 802.11 (i.e., WiFi), or IEEE 802.15.4 (i.e., ZigBee). In some wireless network topologies, for example those using ZigBee, communications from charging control module 332 in one streetlight 102 may be routed and relayed through other such modules 332 in other streetlights 102 until a gateway is reached.

Management server 760 may receive reports from charging control modules 332, or may interrogate them, or both. Whether communication is initiated by management server 760, or by communication module 756, management server 760 is able to access status, energy meter records, and other information.

Monitoring and communication subsystem 750 preferably comprises input 336, which accepts an authorization code (which may be an identification) supplied by a user before enabling charging circuit 702 and outlet 108. Preferably, input 336 is an RFID (radio-frequency identification) reader that is able to read authorization token 770, comprising an RFID tag. Alternatively, authorization token 770 may be a magnetic card (for instance, a credit card or drivers license) and input 336 comprises a magnetic card reader, in which case the authentication code comprises the credit card number or drivers license number contained on the magnetic stripe of the card). In still another embodiment, input 336 may comprise a keyboard and a user enters an authentication code (i.e., an identification number, personal identification number, or passcode) manually, rather than using a token that is read.

If, as a matter of policy, only validated users are permitted to make use of charger outlet 108, then an RFID tag or other authorization token, identification code, or passcode would be provided to the authorized users in advance. The authorization code would be accepted by input 336. The authorization code so received is used by control 752 to query management server 760 (through communication channel 762) to verify the authorization code. If server 760 responds that the authorization code represents a currently authorized user, then the user is validated and charging circuit 702 may be energized.

Also, if as a matter of policy, use of the charging outlet 108 is billed, either by time or by energy consumed, then the authentication code would be used by management server 760 to charge the user's corresponding account. In this case, management server 760 may accumulate the monthly usage by each user and bill periodically (e.g., adding the energy consumed from each of a user's chargings to the user's utility bill, and in the case of an electric vehicle with a utility-interactive inverter, crediting a user for energy supplied by the vehicle), or may handle each transaction independently (e.g., placing a charge or credit to the credit card used as authorization token 770).

Thus, a simple example use case would be that, during daylight hours, while the streetlights 102 are not lit, a user (not shown) pulls up to streetlight 102 in electric vehicle 110 and parks. User connects vehicle 110 to charging station 100 by plugging charging cable 112 into charging outlet 108. If necessary, user presses reset switch 334 to clear a previous ground-fault circuit interrupt or current overload condition. If needed, the user presents an authorization code through input 336, for example by passing a key fob containing an RFID authorization token 770 in proximity to input 336. Charging circuit 502, 602, or 702 is active, and electric vehicle 110 is charging. As the sun sets, streetlight control 240 begins to light lamp 242. The increased current drawn by lighting circuit 501, 601, or 701 is detected, and relay 543, 643, or 743 actuates to open lighting circuit 502, 602, or 702, all respectively, without threatening fuse 222.

In implementations that can determine that the total current of both the lighting and charging circuits (601, 701 and 602, 702, respectively in FIGS. 6 and 7), it may be the case that the charging of electric vehicle 110 has slowed to the point where the addition of the operating current of lamp 242, when lighting or when lit, does not exceed the rating of fuse 222, in which case, relay 643 or 743 may remain closed. This will be especially true if lamp 242 is a retrofit LED-based illuminator that consumes substantially less power than streetlight 102 was originally designed to draw.

While the schematics of FIGS. 5-7 have shown a single-phase power supply to facilitate explanation, the principles presented here can be adapted for a two- or three-phase power system to provide more power and correspondingly shorter vehicle charge times.

Figure 8:
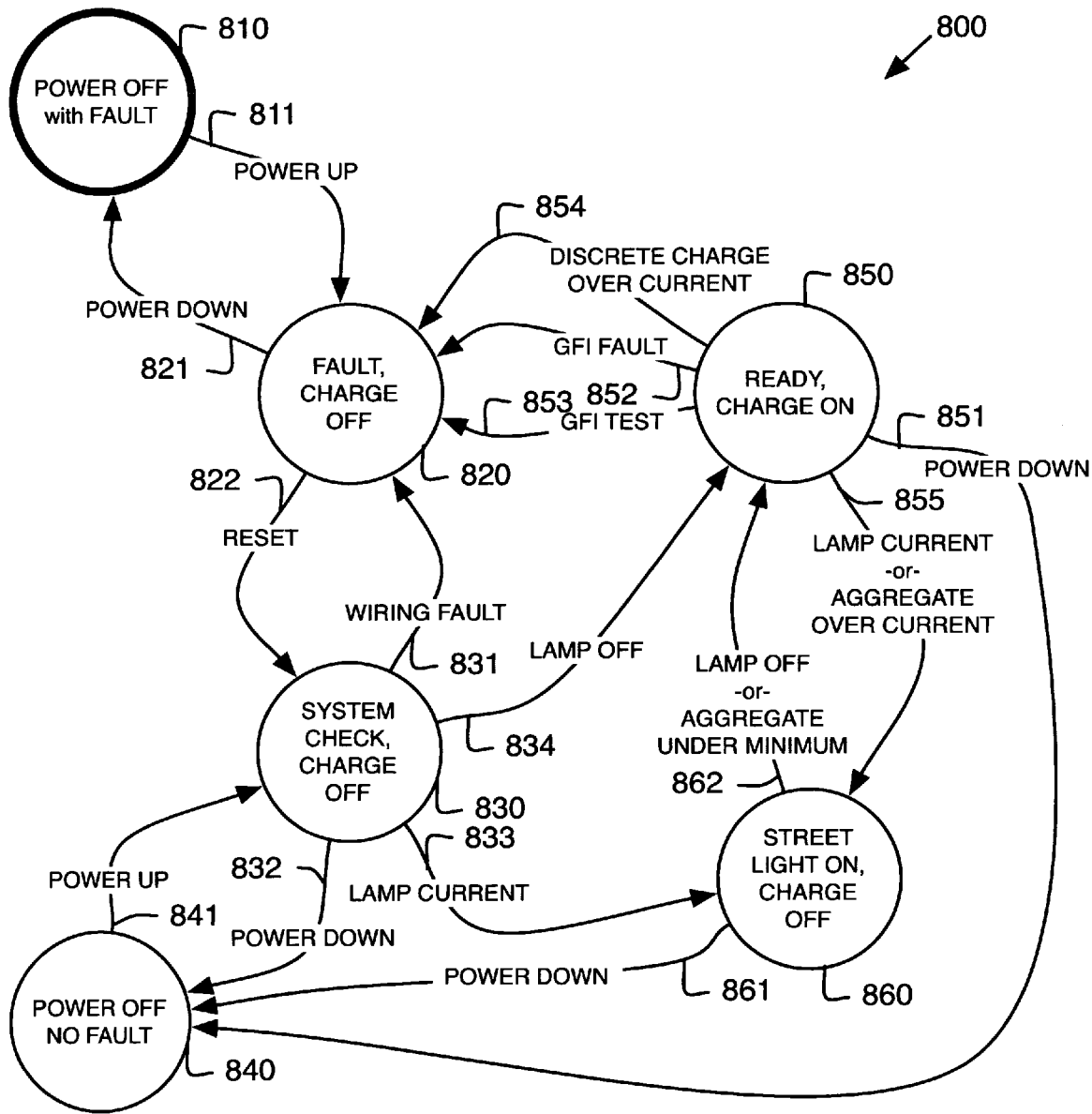
FIG. 8 is an example state transition diagram for controlling the operation of a charging station.

A state transition diagram 800 for the charging station 100 of the present invention is shown in FIG. 8.

Unpowered, faulted state 810 is the initial state, occurring when charging control module 332 is unpowered with a fault recorded. Preferably, module 332 is delivered from the factory in this state. The only transition from this state occurs when power is applied 811, where module 332 transitions to a faulted state 820.

In faulted state 820, charging circuit 502, 602, 702 is off. If power is removed 821 while in faulted state 820, the module 332 transitions back to unpowered, faulted state 810. If reset switch 334 is thrown 822, module 332 transitions to check state 830.

In check state 830, charging circuit 502, 602, 702 remains off. Upon entry to check state 830, and if capable, driver 542 first tests for a wiring fault (e.g., a reversal of hot and neutral lines feeding the charging circuit) and if detected 831, module 332 transitions back to faulted state 820. This prevents module 332 from operating while miswired. Otherwise, if power is removed 832 (or fails), module 332 transitions to unpowered, unfaulted state 840. If substantial current is detected 833 in lighting circuit 501, 601, 701, indicative of lamp 242 lighting or being lit, or lamp 242 is otherwise detected as being lit, then module 332 transitions to lamp on state 860. Otherwise, lamp 242 is considered off 834, and module 332 transitions to ready state 850.

From unpowered, unfaulted state 840, the only transition is when power is reapplied 841, to check state 830. In an alternative embodiment, unpowered, unfaulted state 840 may be folded together with unpowered, faulted state 810, and when power is restored, the successor state is faulted state 820.

On entry to ready state 850, charging circuit 502, 602, 702 is enabled, unless required by policy to be enabled by an authorization or activation through input 334 (not explicitly shown in state transition diagram 800). If power is removed 851, the system transitions to unpowered, unfaulted state 840. If a ground-fault is detected 852, or a ground-fault is induced by test 853, the state transitions to faulted state 820, and charging circuit 502, 602, 702 is disabled. If the charging circuit 502, 602, 702 current draw exceeds a predetermined value 854, a value selected to protect fuse 222, then the system transitions to faulted state 820: In the case of example charging circuit 502, this would correspond to tripping the circuit breaker 532, whereas in example charging circuit 602, 702, the corresponding driver 642, 742 would open the corresponding relay 643, 743. If the aggregate current draw of charging circuit 602, 702 and lighting circuit 601, 701 exceeds a predetermined value 855 (or if lamp 242 is detected as being lit in lighting circuit 501), a value selected to protect fuse 222, then the system transitions to lamp on state 860, where charging circuit 502, 602, 702 will be disabled, thereby relieving the over-current situation before fuse 222 is damaged.

Upon entry into lamp on state 860, charging circuit 502, 602, 702 is disabled, and the streetlight 102 operates normally. Note that charging control module 332, as shown, does not protect fuse 222 from excessive currents drawn solely by lighting circuit 501, 601, 701. From lamp on state 860, if power is removed 861, the state transitions to unpowered, unfaulted state 840. When the current in lighting circuit 501, 601, 701 is detected as being below a predetermined value 862 indicating that lamp 242 is no longer lit, charging control module 332 transitions to ready state 850. Preferably, the predetermined value that indicates that lamp 242 is no longer lit is different than the predetermined value indicative of lamp 242 lighting used to trigger transition 855, as some degree of hysteresis is desirable to prevent unwanted, rapid oscillations between ready state 850 and lamp on state 860. A time delay of several seconds or minutes may further be included in conjunction with transition 862 during which a re-lighting of lamp 242 would cause the system to return to lamp on state 860 without having energized charging circuit 502, 602, 702.

Embodiments of the present invention should comply with Article 625 of the National Electrical Code, and if used to support an electric vehicle feeding energy back into the electric grid, then embodiments should further comply with Article 705.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the following claims.

I claim:

1. A charging station for an electric vehicle, said charging station comprising:
   a streetlight;
   a power source protected by a fuse, said fuse having a current rating,
   a first circuit connecting said streetlight to said power source, said streetlight drawing a first current through said first circuit, said first current not greater than said current rating when said streetlight is lit;
   a second circuit connecting a vehicle to said power source through an outlet, said vehicle drawing a second current through said second circuit when said vehicle is charging;
   a relay, said relay having a contact in series with said second circuit, said relay operable to complete said second circuit with said contact to allow charging the vehicle, said relay further operable to break said second circuit with said contact to not allow charging the vehicle;
   a third circuit, said third circuit comprising a first detector responsive to one of said first current and said streetlight being lit, said third circuit operatively connected to said relay to break said second circuit when said streetlight is lit;
   whereby said outlet is available for charging the vehicle when said streetlight is not lit.

2. The charging station of claim 1 further comprising:
   an input, said input having communication with said third circuit, said input accepting an authentication code;
   wherein said third circuit operates said relay to complete said second circuit when said authentication code is accepted.

3. The charging station of claim 1 wherein
   said third circuit further comprises a second detector responsive to said second current,
   said third circuit further operating said relay to break said second circuit when said second current exceeds a non-zero first predetermined value not greater than the current rating,
   said third circuit further operating said relay to break said second circuit when said streetlight is lit and said second current exceeds a second predetermined value not greater than the current rating minus the first current;
   whereby said relay is operated to protect said fuse.

4. The charging station of claim 3 further comprising:
   an energy meter, said energy meter making a record of energy delivered through at least the second circuit.

5. The charging station of claim 4 further comprising:
   a display having communication with said energy meter, said display showing the record of energy delivered.

6. The charging station of claim 4 further comprising:
   a communication module, said communication module having a connection to a communication channel, said communication module further having communication with said energy meter;
   whereby said energy meter can be read remotely through said communication channel.

7. The charging station of claim 6 further comprising:
   an input, said input having communication with said third circuit and said communication module, said input accepting an authentication code, said input verifying said authentication code with said communication module through said communication channel;
   wherein said third circuit operates said relay to complete said second circuit when said authentication code is verified.

8. The charging station of claim 1 wherein
   said third circuit further comprises a second detector responsive to said second current,
   said third circuit further operating said relay to break said second circuit when said first current plus said second current exceeds a first predetermined value not greater than the current rating;
   whereby said relay is operated to protect said fuse.

9. The charging station of claim 8 further comprising:
   an input, said input having communication with said third circuit, said input accepting an authentication code;
   wherein said third circuit operates said relay to complete said second circuit when said authentication code is accepted.

10. The charging station of claim 8 further comprising:
    an energy meter, said energy meter recording the energy delivered through at least the second circuit.

11. The charging station of claim 10 further comprising:
    a display having communication with said energy meter, said display showing the record of energy delivered.

12. The charging station of claim 10 further comprising:
    a communication module, said communication module having a connection to a communication channel, said communication module further having communication with said energy meter;
    whereby said energy meter can be read remotely through said communication channel.

13. The charging station of claim 12 further comprising:
    an input, said input having communication with said third circuit and said communication module, said input accepting an authentication code, said input verifying said authentication code with said communication module through said communication channel;
    wherein said third circuit operates said relay to complete said second circuit when said authentication code is verified.

14. A method for charging an electric vehicle, said method comprising the steps of:
    a) providing a first circuit comprising a power supply and a streetlight, and a second circuit for connecting an electric vehicle to the power supply through a contact of a relay;
    b) providing at least one detector responsive to at least said streetlight being lit;
    c) automatically operating said relay to open said contact when said at least one detector indicates said streetlight is lit;
    whereby said electric vehicle may charge when said streetlight is not lit.

15. The method of claim 14, wherein said power supply is protected by a fuse having a current rating, and wherein said at least one detector is further responsive to a second current in said second circuit, and wherein step c) is further constrained top operate said relay to open when the sum of a first current in said first circuit when said streetlight is lit and said second current exceeds a predetermined value, said predetermined value not greater than said current rating.

16. The method of claim 14 further comprising the steps of:
    d) providing an input, said input able to accept an authentication code and operate said relay; and,
    e) automatically operating said relay to close said contact when said authentication code is accepted by said input.

17. The method of claim 14 further comprising the step of:
    d) automatically making a record of energy delivered through at least said second circuit with an energy meter.

18. The method of claim 17 further comprising the step of:

e) providing a display having access to the record of energy delivered; and, f) displaying the record of energy delivered with the display.

19. The method of claim 17, further comprising the step of:

e) providing a communication module having connections to a communication channel and said energy meter; and, f) remotely accessing the record of energy delivered through said communication channel.

20. The method of claim 19, further comprising the steps of:

d) providing an input, said input able to accept an authentication code;

e) verifying said authentication code through said communication channel; and, f) automatically operating said relay to close said contact when said authentication code is verified.

* * * * *